| (12) | United States Patent | (10) Patent No.: | US 7,390,004 B2 |
|---|---|---|---|
| | Gogo et al. | (45) Date of Patent: | Jun. 24, 2008 |

(54) STEERING DAMPER DEVICE

(75) Inventors: Kazuhiko Gogo, Saitama (JP); Akimi Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 11/235,523

(22) Filed: Sep. 27, 2005

(65) Prior Publication Data

US 2006/0207845 A1    Sep. 21, 2006

(30) Foreign Application Priority Data

Sep. 28, 2004   (JP) .............................. 2004-280960
Aug. 30, 2005   (JP) .............................. 2005-248749

(51) Int. Cl.
*F16D 57/02*   (2006.01)
*B62K 21/08*   (2006.01)

(52) U.S. Cl. ........................ 280/272; 188/290
(58) Field of Classification Search ................. 280/272; 180/219; 188/290
See application file for complete search history.

(56) References Cited

U.S. PATENT DOCUMENTS 5,405,159 A * 4/1995 Klein et al. ................. 280/283
7,021,433 B2 * 4/2006 Yamada et al. .............. 188/294
2005/0087969 A1 * 4/2005 Okazaki et al. ............. 280/771
2006/0220340 A1 * 10/2006 Seki et al. ................... 280/272

FOREIGN PATENT DOCUMENTS

JP    2000-255473    9/2000

* cited by examiner

*Primary Examiner*—Kevin Hurley
(74) *Attorney, Agent, or Firm*—Arent Fox LLP

(57) ABSTRACT

In a steering damper device, a rotary damper includes a damper case, a rotary shaft rotatably supported on the case, and an actuation lever connected to the rotary shaft; the damper case is mounted to a steering side member; and a tip end of the actuation lever is connected to a frame side member. One end of a control lever is connected to the frame side member via a first pivot. A tip end of the actuation lever is connected to the other end of the lever via a second pivot. The first and second pivots are arranged so that a line connecting the centers of the first and second pivots is substantially intersected by an axis of a steering stem at a steering angle of 0°. Thus, the steering damper device can obtain desired characteristics while using a rotary damper with a simple structure.

5 Claims, 9 Drawing Sheets

STEERING DAMPER DEVICE

RELATED APPLICATION DATA

The present invention is based upon Japanese priority application Nos. 2004-280960 and 2005-248749, which are hereby incorporated in their entirety herein by reference.

BACKGROUND OF THE INVENTION

1. Field of the Invention

The present invention relates to a steering damper device used in a small-sized vehicle such as a motorcycle. More particularly, the present invention relates to an improvement of a steering damper device in which a rotary damper includes a damper case, a rotary shaft rotatably supported on the damper case, and an actuation lever connected to an outer end of the rotary shaft, and is configured so that the rotary shaft is rotated to generate a damping force in the damper case; the damper case is mounted to a steering side member that is rotated around a steering stem by an operation of a handlebar; and a tip end of the actuation lever is connected to a frame side member that is not rotated by the operation of the handlebar.

2. Description of the Related Art

In a motorcycle, a front fork supporting a front wheel is rotated by an operation of a handlebar around a steering stem that is rotatably inserted into a head pipe at a front end of a vehicle body frame, to thereby perform steering. In some cases, such a motorcycle is provided with a steering damper device between a steering side member that is rotated by the operation of the handlebar and a frame side member that is not rotated by the operation of the handlebar. In such cases, the steering damper device is required to generate little damping moment in normal driving with a small steering angle of the handlebar and a low angular speed, to generate a high damping moment in a situation with a large steering angle of the handlebar and a high angular speed, to set a low damping moment in a situation with a low speed and a relatively large steering angle of the handlebar because of continuous small turns, thereby minimizing the load on the operation of the handlebar; also required to generate little damping moment when steering is returned. For this purpose, some of conventional motorcycle steering damper devices use an oscillating damper and have a bypass that changes a damping force in a complicated manner to meet the requirements described above.

However, such a steering damper device using the oscillating damper has a complicated structure and is expensive, large and heavy, which may sometimes restrict the arrangement of other components.

A motorcycle steering damper device comprising a rotary damper that has a simple structure and is inexpensive has been also known (for example, see Japanese Patent Laid-Open No. 2000-255473). The steering damper device is configured so that with a rotary shaft of the rotary damper being arranged coaxially with a steering stem, a damper case is secured to a front fork, a tip end of an actuation lever is rotatably connected directly to a vehicle body frame, and the rotary shaft is rotated to generate a damping force in the damper case at the time of steering.

In the device using the rotary damper described above, however, a steering angle and a rotation angle of the rotary shaft linearly increase proportional to each other, and thus a complicated control device needs to be added in order to meet the requirements described above.

SUMMARY OF THE INVENTION

The present invention is achieved in view of such circumstances, and has an object to provide a steering damper device having desired characteristics while using a rotary damper with a simple structure.

In order to achieve the above-mentioned object, according to a first feature of the invention, there is provided a steering damper device in which a rotary damper includes a damper case, a rotary shaft rotatably supported on the damper case, and an actuation lever connected to an outer end of the rotary shaft, and is configured so that the rotary shaft is rotated to generate a damping force in the damper case; the damper case is mounted to a steering side member that is rotated around a steering stem by an operation of a handlebar; and a tip end of the actuation lever is connected to a frame side member that is not rotated by the operation of the handlebar, wherein one end of a control lever is rotatably connected to the frame side member via a first pivot, a tip end of the actuation lever is rotatably connected to the other end of the control lever relative to each other via a second pivot, the first and second pivots are arranged so that a line connecting the centers of the first and second pivots is substantially intersected by an axis of the steering stem at a steering angle of 0°, and thus a rotation angle of the rotary shaft increases in the form of a quadratic curve with increase in the steering angle from 0°.

With the first feature of the present invention, the line connecting the centers of the first pivot and the second pivot is intersected by the axis of the steering stem at the steering angle of 0° so that the rotation angle of the rotary shaft increases in the form of a quadratic curve with increase in the steering angle from 0°. Thus, the rotation characteristic of the rotary shaft is the same whichever the handlebar is turned to the left or right, and the damping force given to the handlebar may be always increased in the form of a quadratic curve with increase in the steering angle from 0°.

Also, according to a second feature of the invention, in addition to the first feature, the actuation lever is linearly aligned with the control lever on plan view at the steering angle of 0°.

With the second feature of the present invention, the actuation lever is linearly aligned with the control lever on plan view at the steering angle of 0°, thereby easily and reliably imparting to the handlebar a damping characteristic in the form of a quadratic curve.

Further, according to a third feature of the invention, in addition to the second feature, a spring is connected to at least one of the actuation lever and the control lever so as to rotatably urge the lever to one side, so that the actuation lever and the control lever are bent in a fixed direction around the second pivot regardless of a steering direction at the time of steering from the steering angle of 0°.

With the third feature of the present invention, in the simple configuration in which the spring is connected to at least one of the actuation lever and the control lever to rotatably urge the lever to one side, the rotary shaft can be rotated in the fixed direction regardless of the steering direction at the time of steering from the steering angle of 0°, thereby generating damping forces of different magnitudes at the times of turning and returning of a rotary vane connected to the rotary shaft, and giving different damping moments to the handlebar at the times of turning and returning the handlebar. Further, the capacity of an oil chamber of the damper case can be reduced.

Furthermore, according to a fourth feature of the invention, in addition to the first feature, the actuation lever and the control lever are arranged so as to be bent around the second pivot at the steering angle of 0°, so that the rotary shaft is rotated in a fixed direction regardless of a steering direction at the time of steering from the steering angle of 0°.

With the fourth feature of the present invention, with the simple configuration in which the actuation lever and the control lever are bent around the second pivot at the steering angle of 0°, the rotary shaft can be rotated in the fixed direction regardless of the steering direction at the time of steering from the steering angle of 0°, thereby generating damping forces of different magnitudes at the time of turning and returning of the rotary vane connected to the rotary shaft, and giving different damping moments to the handlebar at the times of turning and returning the handlebar. Further, the capacity of the oil chamber of the damper case can be reduced.

Moreover, according to a fifth feature of the invention, in addition to the fourth feature, the control lever and the actuation lever are arranged to form a right angle on plan view at the steering angle of 0°.

With the fifth feature of the present invention, the control lever and the actuation lever are arranged to form a right angle on plan view at the steering angle of 0°, thereby easily and reliably imparting to the handlebar a damping characteristic in the form of a quadratic curve.

The foregoing and other objects, features and advantages of the present invention will become apparent from the following detailed description of a preferred embodiment with reference to the accompanying drawings.

DESCRIPTION OF THE PREFERRED EMBODIMENTS

Now, preferred embodiments of the present invention will be described with reference to the accompanying drawings.

A first embodiment of the present invention shown in FIGS. 1 to 7 will be first described.

Figure 1:
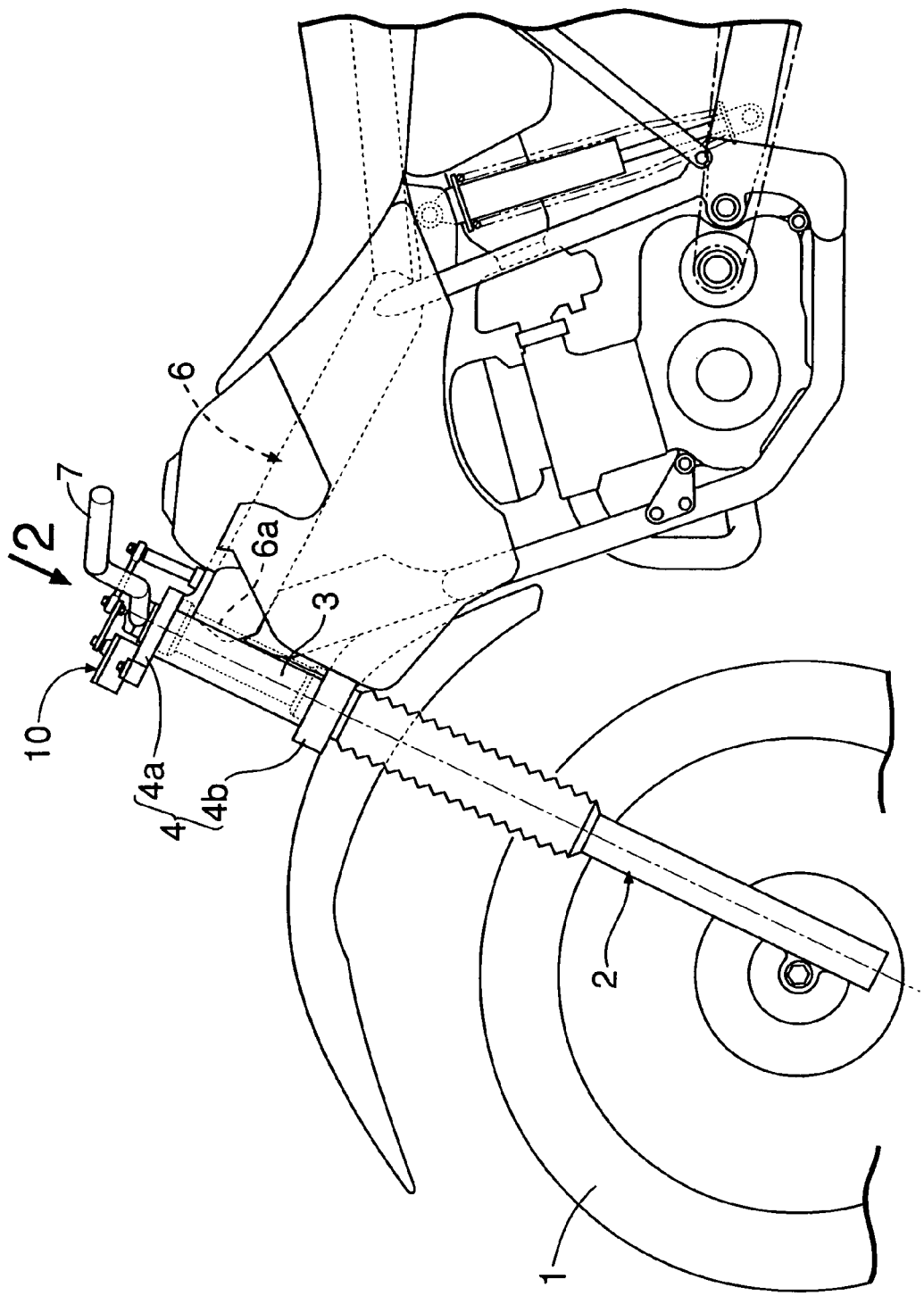
FIG. 1 is a side view of essential portions of a motorcycle including a steering damper device according to a first embodiment of the present invention.
Figure 2:
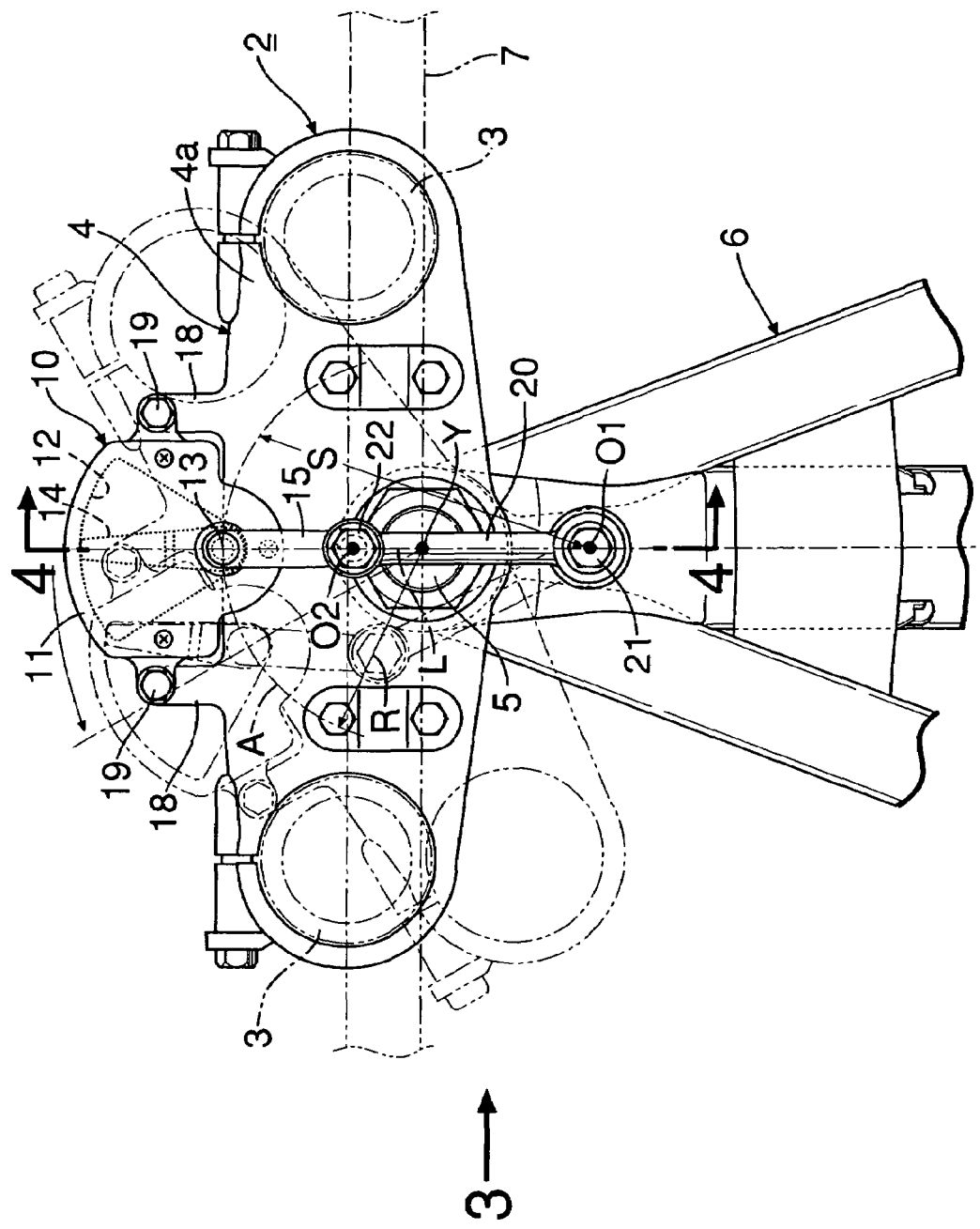
FIG. 2 is an enlarged view in the direction of arrow 2 in FIG. 1.
Figure 3:
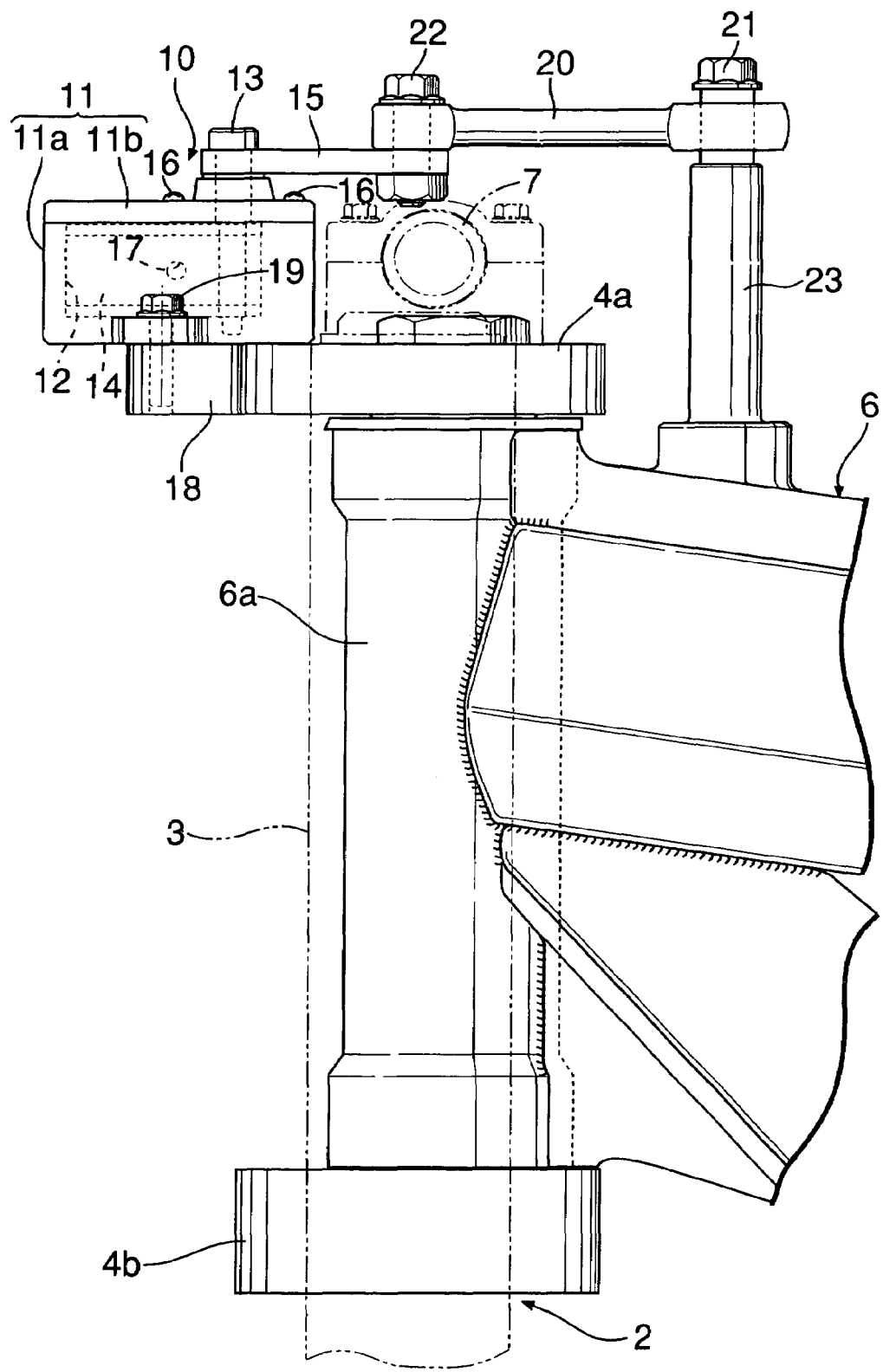
FIG. 3 is an enlarged view in the direction of arrow 3 in FIG. 2.
Figure 4:
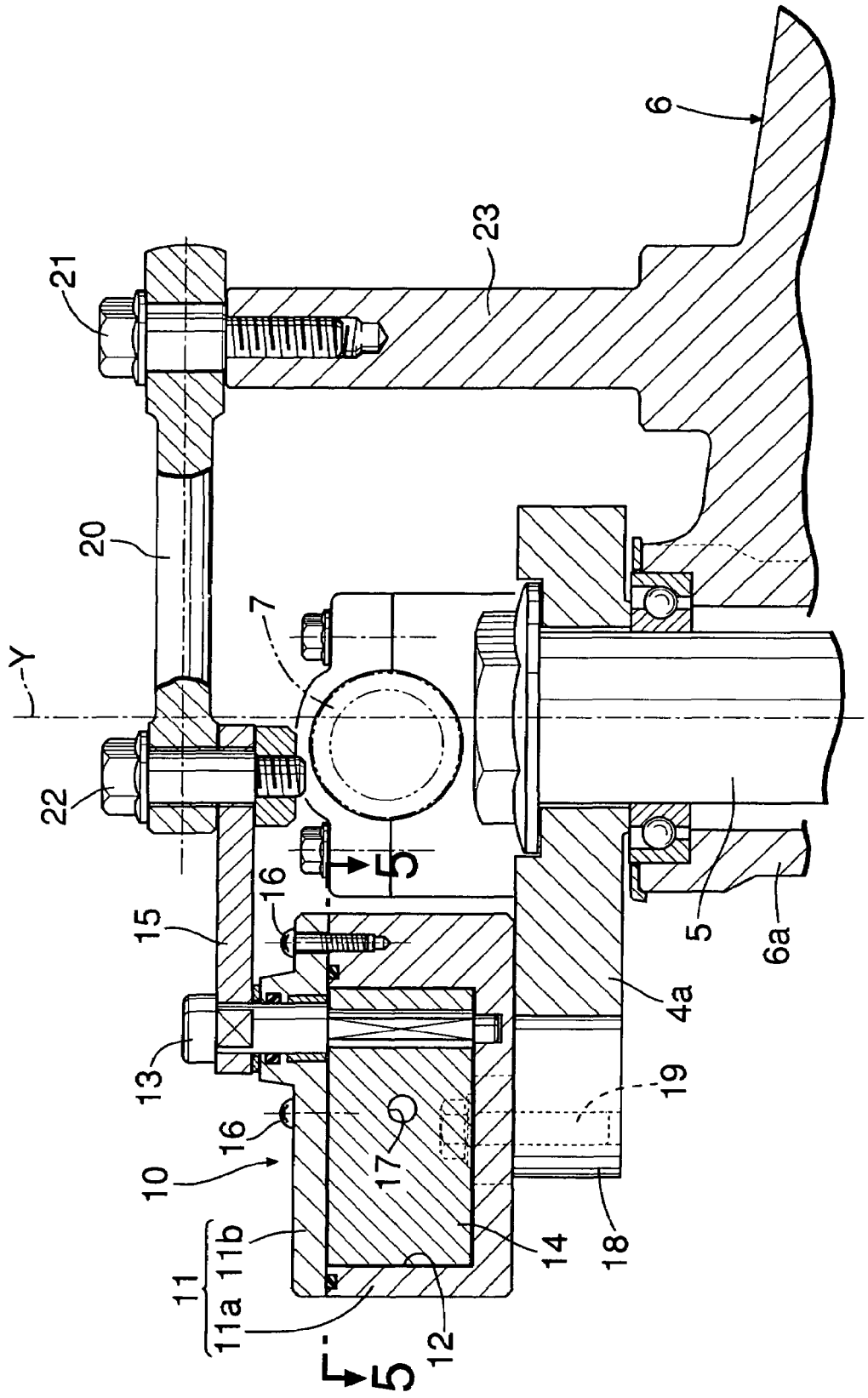
FIG. 4 is an enlarged sectional view taken along the line 4-4 in FIG. 2.
Figure 5:
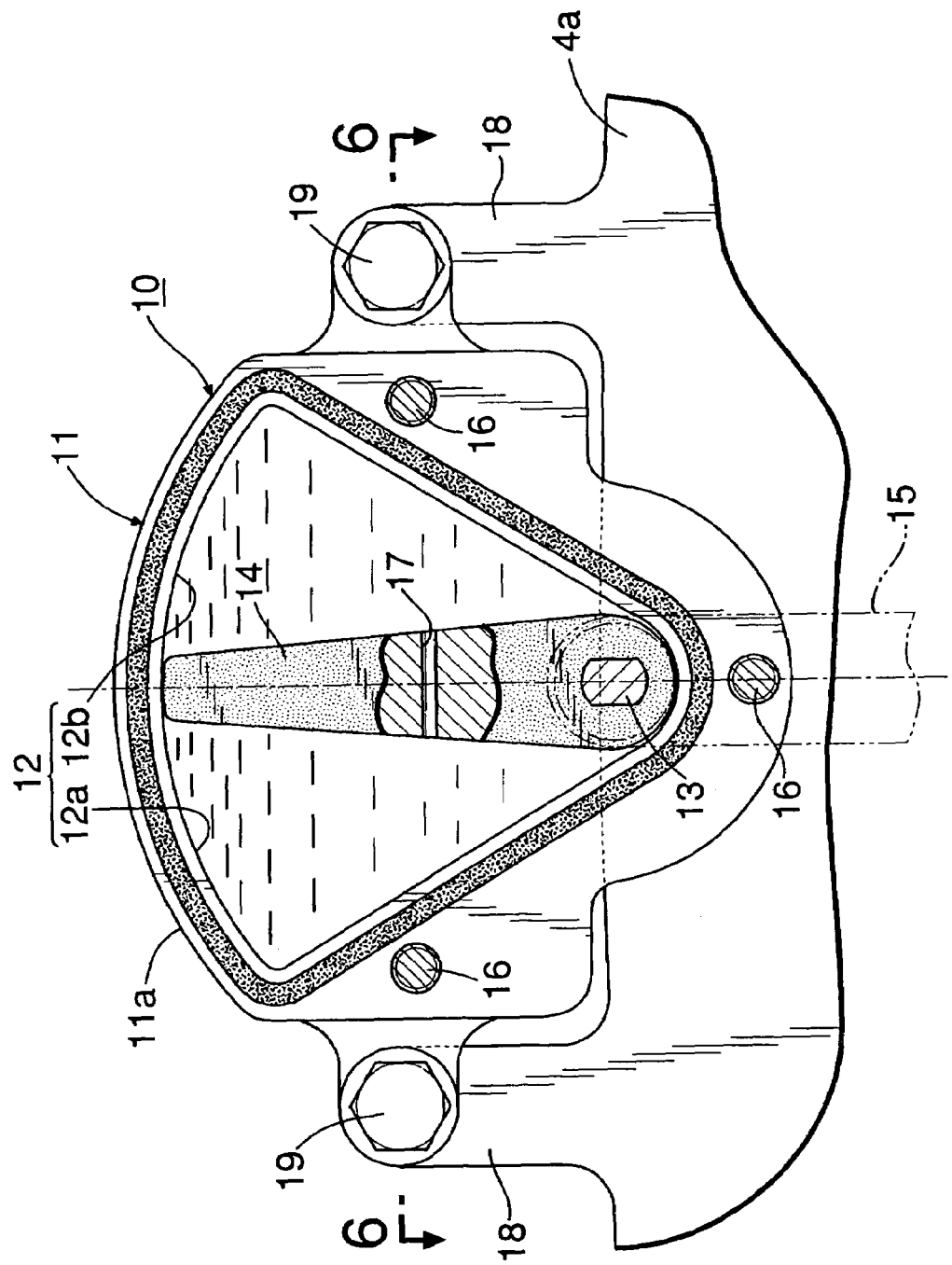
FIG. 5 is a sectional view taken along the line 5-5 in FIG. 4.
Figure 6:
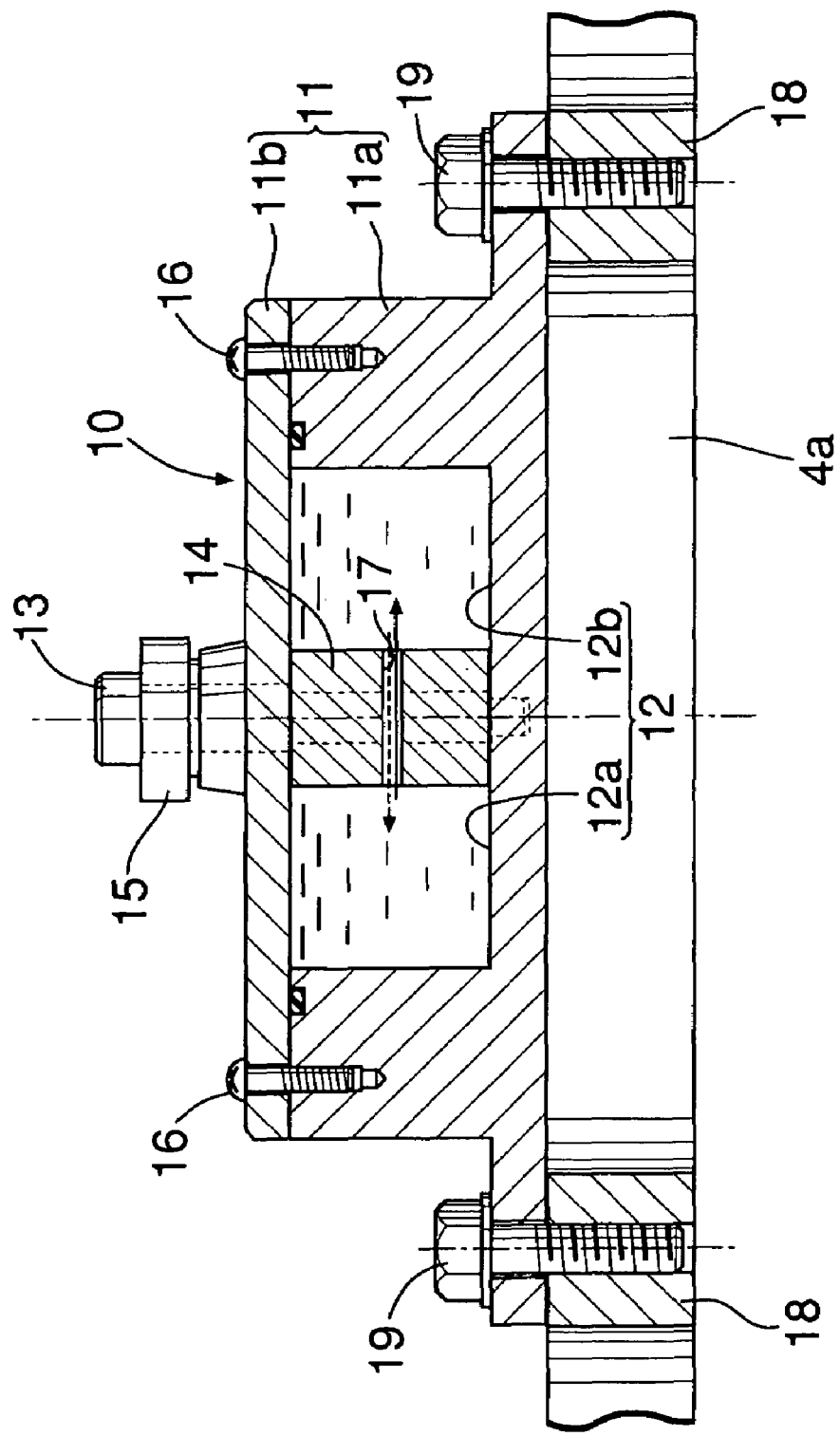
FIG. 6 is a sectional view taken along the line 6-6 in FIG. 5.

First, in FIGS. 1 and 2, a front fork 2 supporting a front wheel 1 of a motorcycle includes left and right fork pipes 3 and 3, and a fork bridge 4 connecting top ends of the fork pipes. The fork bridge 4 includes a pair of a top bridge 4a and a bottom bridge 4b that are vertically spaced in parallel with each other. The bridges 4a and 4b are integrally connected at the lateral centers via a steering stem 5. The steering stem 5 is rotatably supported on a head pipe 6a provided at a front end of a vehicle body frame 6. A handlebar 7 for steering is mounted to the top bridge 4a. Thus, the handlebar 7 is operated to rotate the front fork 2 to the left and right around the steering stem 5, thereby steering the front wheel 1 supported by the front fork 2.

As shown in FIGS. 2 to 6, a rotary hydraulic damper 10 is provided between the top bridge 4a and the vehicle body frame 6. The hydraulic damper 10 includes: a damper case 11 having an oil chamber 12 filled with damper oil; a rotary shaft 13 rotatably supported on the damper case 11; a rotary vane 14 connected to the rotary shaft 13 and rotated by the rotary shaft 13 in the oil chamber 12 of the damper case 11; and an actuation lever 15 connected to an outer end of the rotary shaft 13.

The damper case 11 includes a case body 11a in which the oil chamber 12 with an open upper surface is formed, and a lid 11b joined by plurality of screws 16 and 16 to a top end surface of the case body 11a so as to close the oil chamber 12. The case body 11a is secured by bolts 19 and 19 to a pair of left and right front stays 18 and 18 formed in the top bridge 4a in front of the steering stem 5. In this arrangement, the damper case 11 is arranged so that the rotary shaft 13 is in parallel with the steering stem 5.

The rotary shaft 13 is rotatably supported on a bottom wall of the case body 11a and the lid 11b. The oil chamber 12 has the shape of a sector around the rotary shaft 13. The rotary vane 14 connected to the rotary shaft 13 in the oil chamber 12 is arranged so as to partition the oil chamber 12 into a left first chamber 12a and a right second chamber 12b. The rotary vane 14 has an orifice 17 that provides communication between the first chamber 12a and the second chamber 12b. When the rotary vane 14 is rotated to the left or right by the rotary shaft 13, the damper oil in the oil chamber 12 flows between the first chamber 12a and the second chamber 12b through the orifice 17 to generate a damping force to the rotation of the rotary shaft 13.

The rotary shaft 13 has a top end protruding above the lid 11b, and the actuation lever 15 is secured to the top end.

On the other hand, to a rear stay 23 protruding from an upper surface of the vehicle body frame 6 in the rear of the steering stem 5, one end of a control lever 20 is rotatably connected via a first pivot 21, and the other end of the control lever 20 and a tip end of the actuation lever 15 are rotatably connected relative to each other via a second pivot 22.

At that time, the first pivot 21 and the second pivot 22 are arranged in parallel with the rotary shaft 13. The first pivot 21 and the second pivot 22 are arranged in the front and rear of an axis Y of the steering stem 5 so that a line L connecting the centers O1 and O2 of the pivots is substantially intersected by the axis Y of the steering stem 5 when the handlebar 7 is in a neutral position, that is, at a steering angle of 0°. Also, the actuation lever 15 and the control lever 20 are linearly aligned with each other on plan view at the steering angle of 0°. Further, the rotary vane 14 is arranged so as to occupy a laterally central position of the oil chamber 12 at the steering angle of 0°.

Next, an operation of the first embodiment will be described.

When the handlebar 7 is in the neutral position, that is, at the steering angle of 0°, the line L connecting the centers O1 and O2 of the first pivot 21 and the second pivot 22 is substantially intersected by the axis Y of the steering stem 5, the actuation lever 15 and the control lever 20 are linearly aligned with each other on plan view, and the rotary vane 14 occupies the central position of the oil chamber 12. In this state, if the handlebar 7 is turned to the left, for example, the front fork 2 is rotated to the left around the steering stem 5 as shown by the chain line in FIG. 2. Thus, the damper case 11 secured to the top bridge 4a is similarly rotated, and the rotary shaft 13 rotatably supported on the damper case 11 draws an arc A around the steering stem 5 with a distance R as a radius between the centers of the steering stem 5 and the rotary shaft 13. Thus, a distance S between the rotary shaft 13 and the first pivot 21 is reduced from a maximum value when the handlebar is turned to either the left or right from the steering angle 0°. As a result, the actuation lever 15 and the control lever 20 are bent to the left or right around the second pivot 22 to rotate the rotary shaft 13 relative to the damper case 11, and thus the rotary vane 14 connected to the rotary shaft 13 is rotated in the oil chamber 12, the damper oil in the oil chamber 12 flows between the first chamber 12a and the second chamber 12b through the orifice 17 of the rotary vane 14, thereby generating a damping force to give a damping moment to the handlebar 7. Also when the handlebar 7 is returned to the neutral position, the rotational direction of the rotary vane 14 is simply reversed to generate a similar damping force.

Similarly, when the handlebar 7 is turned to the right, the actuation lever 15 and the control lever 20 are bent to the left or right around the second pivot 22 to rotate the rotary vane 14 in the oil chamber 12, thereby generating a damping force to give a damping moment to the handlebar 7. Also when the handlebar 7 is returned to the neutral position, the rotational direction of the rotary vane 14 is simply reversed to generate a similar damping force.

Figure 7:
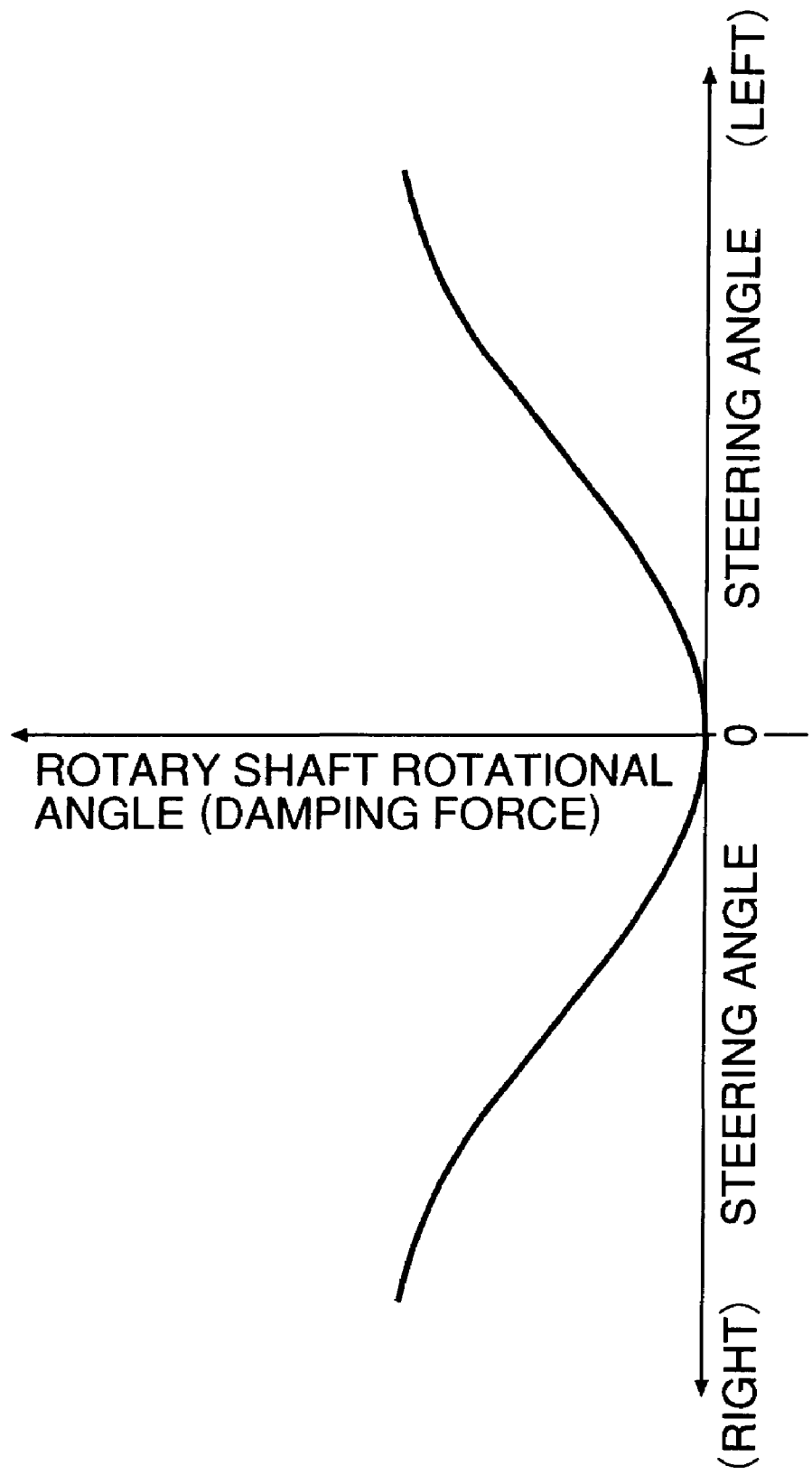
FIG. 7 shows a characteristic curve of the steering damper device.

Thus, the rotary vane 14 is rotated under the same condition in the oil chamber 12 of the damper case 11 when the handlebar 7 is turned to either the left or right from the position of the steering angle of 0°, so that damping force characteristics generated in both cases become symmetric as in FIG. 7.

In particular, the line L connecting the centers O1 and O2 of the first pivot 21 and the second pivot 22 is intersected by the axis Y of the steering stem 5 at the steering angle of 0°, and the actuation lever 15 and the control lever 20 are linearly aligned with each other on plan view. Therefore, as shown in FIG. 7, the rotation angle of the rotary shaft 13, that is, the rotation angle of the rotary vane 14 increases in the form of a quadratic curve with increase in the steering angle from 0°, and the damping moment given to the handlebar 7 also increases in the form of a quadratic curve, thereby generating a low damping moment in the case of a small steering angle of the handlebar 7, and generating a higher damping moment with increase in the steering angle. Additionally, the moment is smoothly continuously changed.

In this manner, this steering damper device can meet the requirements described above for the motorcycle. Further, the control lever 20 connecting together the actuation lever 15 and the vehicle body frame 6 is merely added to a conventional steering damper device, and thus the device has a simple structure and is inexpensive.

Next, a second embodiment of the present invention shown in FIG. 8 will be described.

In the second embodiment, in addition to the configuration of the first embodiment described above, a spring 25 that urges the actuation lever 15 and the control lever 20 so as to be bent in a fixed direction of the left or right is connected to at least one of the actuation lever 15 and the control lever 20, in the shown example, connected to the actuation lever 15. Thus, the rotary shaft 13 and the rotary vane 14 are rotated in the fixed direction regardless of a steering direction at the time of steering from the steering angle of 0°.

On the other hand, the rotary vane 14 is arranged close to one of left and right inner side walls of the oil chamber 12 of the damper case 11 at the steering angle of 0°. Here, one of the inner side walls of the oil chamber 12 refers to an inner side wall opposite to the rotational direction of the rotary vane 14 at the time of steering from the steering angle of 0°, and in the shown example, it refers to the left inner side wall. The rotary vane 14 has a one-way valve 26 in parallel with the orifice 17. When the steering is returned, the one-way valve 26 opens to allow the damper oil to smoothly flow between the first oil chamber 12a and the second oil chamber 12b of the oil chamber 12, thereby attenuating the damping force which has been generated.

Figure 8:
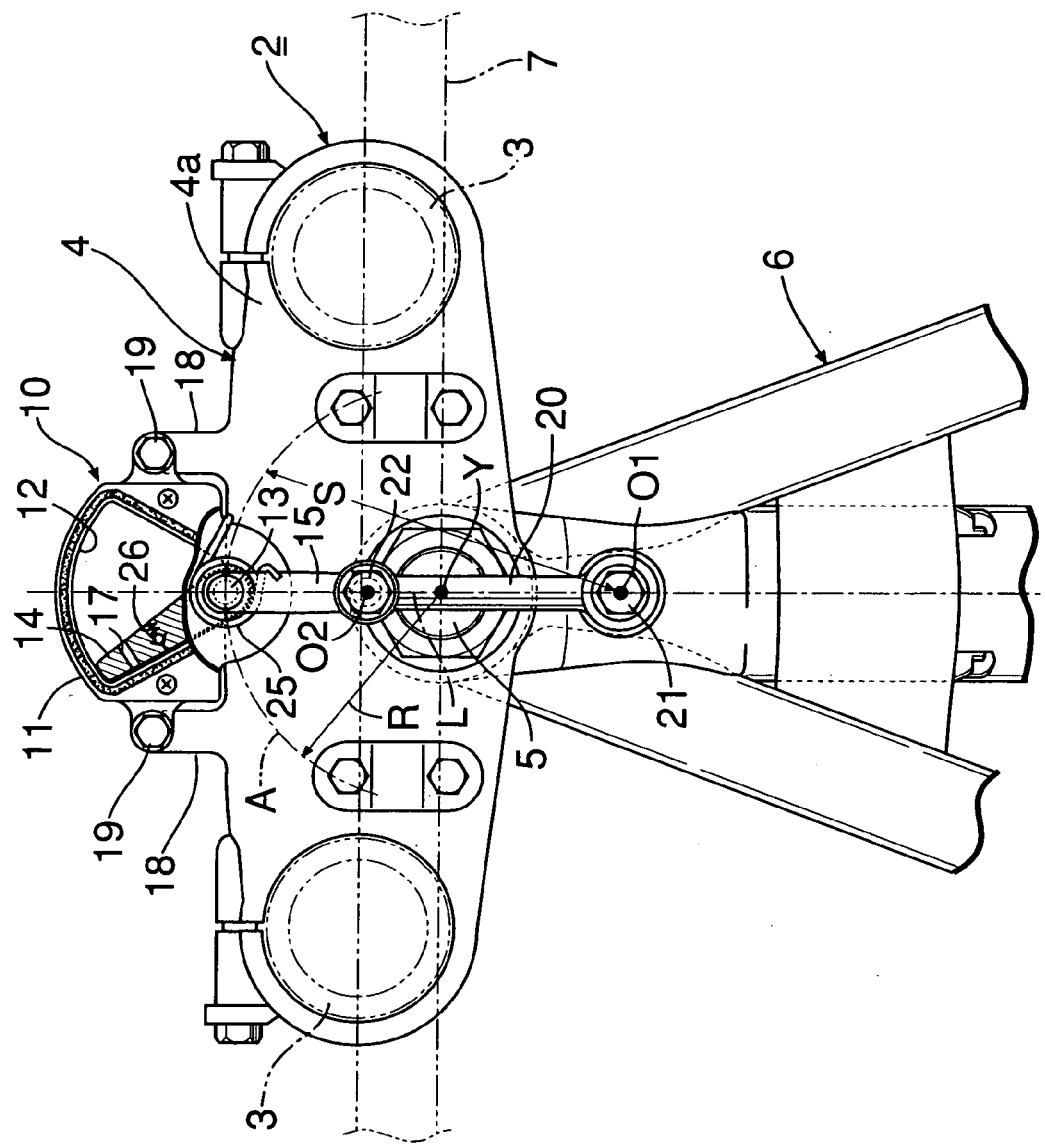
FIG. 8 is a plan view of essential portions of a motorcycle including a steering damper device according to a second embodiment of the present invention.

As the other components are the same as in the first embodiment, components in FIG. 8 corresponding to those in the fist embodiment are denoted by the same reference numerals, and overlapping descriptions will be omitted.

According to the second embodiment, the rotary shaft 13 and the rotary vane 14 are rotated in a fixed direction of closing the one-way valve 26 regardless of a steering direction at the time of steering from the steering angle of 0°, so that the damper oil in the oil chamber 12 passes through the orifice 17 of the rotary vane 14 to generate a damping force and give a damping moment to the handlebar 7.

When the handlebar 7 is returned to the neutral position, the rotational direction of the rotary vane 14 is reversed, so that the damper oil in the oil chamber 12 flows in the reverse direction to open the one-way valve 26. Thus, a reduced damping force is generated at this time, thereby lightly returning the handlebar 7 to the neutral position.

Further, the rotational direction of the rotary vane 14 is always fixed regardless of the steering direction of the handlebar 7, and thus only a rotational stroke of the rotary vane 14 on one of left and right sides is sufficient, thereby reducing the capacity of the oil chamber 12.

Figure 9:
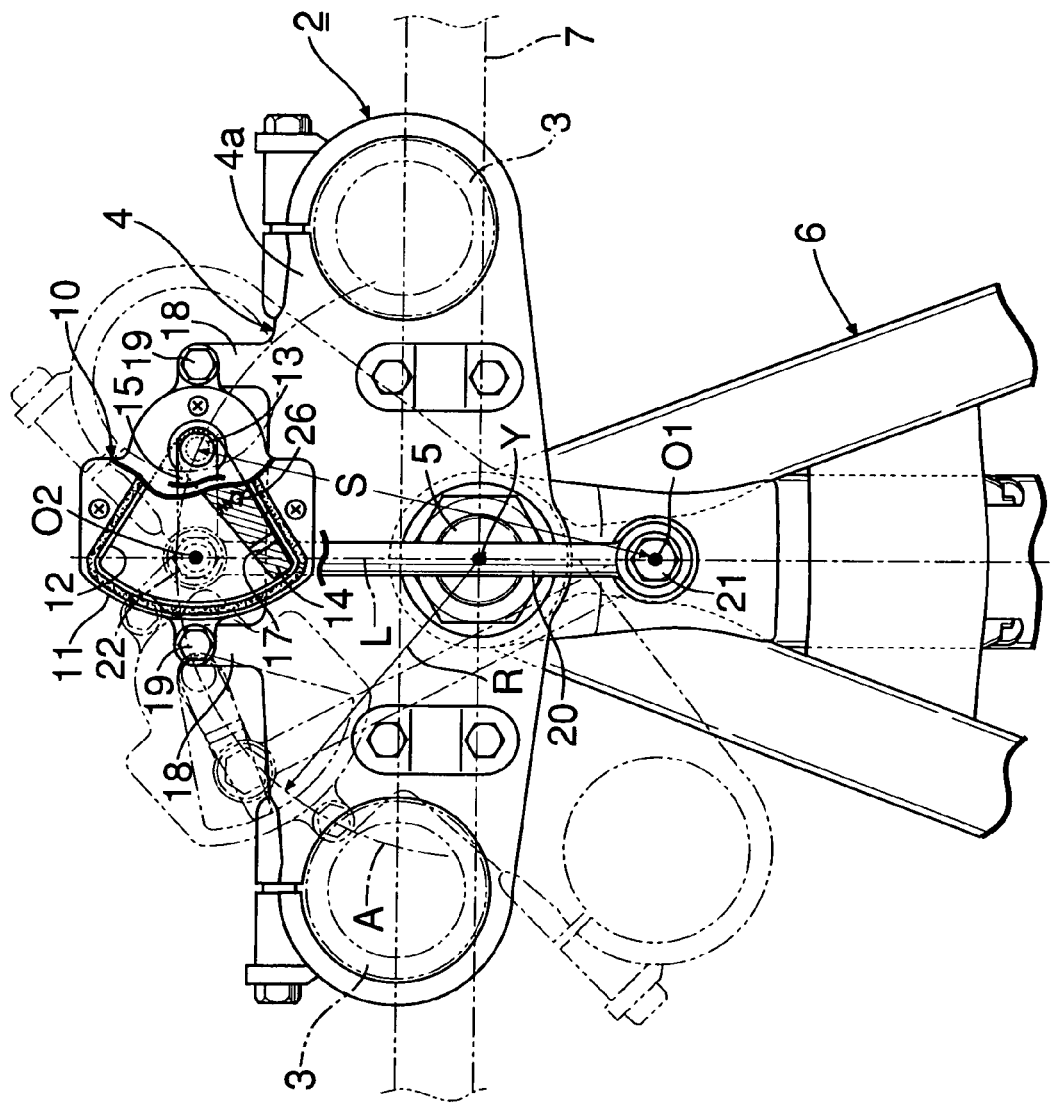
FIG. 9 is a plan view of essential portions of a motorcycle including a steering damper device according to a third embodiment of the present invention.

Finally, a third embodiment of the present invention shown in FIG. 9 will be described.

In the third embodiment, at the steering angle of 0°, with the line L connecting the centers O1 and O2 of the first pivot 21 and the second pivot 22 being substantially intersected by the axis Y of the steering stem 5, the actuation lever 15 and the control lever 20 are perpendicularly aligned with each other.

On the other hand, the rotary vane 14 is arranged close to one of front and rear inner side walls of the oil chamber 12 of the damper case 11 at the steering angle of 0°. Here, one of the inner side walls of the oil chamber 12 refers to an inner side wall opposite to the rotational direction of the rotary vane 14 at the time of steering from the steering angle of 0°, and in the shown example, it refers to the rear inner side wall. The rotary vane 14 has a one-way valve 26 in parallel with the orifice 17. When the steering is returned, the one-way valve 26 opens to allow the damper oil to smoothly flow between the first oil chamber 12a and the second oil chamber 12b of the oil chamber 12, thereby attenuating the damping force which has been generated.

As the other components are the same as in the first embodiment, components in FIG. 8 corresponding to those in the fist embodiment are denoted by the same reference numerals, and overlapping descriptions will be omitted.

According to the third embodiment, when the handlebar 7 is in the neutral position, that is, at the steering angle of 0°, the line L connecting the centers O1 and O2 of the first pivot 21 and the second pivot 22 is substantially intersected by the axis Y of the steering stem 5, and the actuation lever 15 and the control lever 20 are arranged to form a right angle on plan view. In this state, if the handlebar 7 is turned to the left or right, the front fork 2 is rotated around the steering stem 5 as shown by the chain line in FIG. 9. Thus, the damper case 11 secured to the top bridge 4a is similarly rotated, and the rotary shaft 13 rotatably supported on the damper case 11 draws an arc A around the steering stem 5, with a distance R as a radius between the centers of the steering stem 5 and the rotary shaft 13. Thus, a distance S between the rotary shaft 13 and the first pivot 21 is reduced from a maximum value when the handlebar is turned to either the left or right from the steering angle 0°. As a result, the actuation lever 15 is pressed forward and rotated by the control lever 20 with increase in the steering angle from 0° regardless of a steering direction of the handlebar 7, so that the rotary shaft 13 and the rotary vane 14 are rotated in a fixed direction of closing the one-way valve 26, and the damper oil in the oil chamber 12 passes through the orifice 17 of the rotary vane 14 to generate a damping force and give a damping moment to the handlebar 7.

When the handlebar 7 is returned to the neutral position, the rotational direction of the rotary vane 14 is reversed, so that the damper oil in the oil chamber 12 flows in the reverse direction to open the one-way valve 26. Thus, a reduced damping force is generated at this time, thereby lightly returning the handlebar 7 to the neutral position.

Further, the rotational direction of the rotary vane 14 is always fixed regardless of the steering direction of the handlebar 7, so that only a rotational stroke of the rotary vane 14 on one of front and rear sides is sufficient, thereby reducing the capacity of the oil chamber 12.

In the third embodiment, at the steering angle of 0°, with the line L connecting the centers O1 and O2 of the first pivot 21 and the second pivot 22 being substantially intersected by the axis Y of the steering stem 5, the actuation lever 15 and the control lever 20 are arranged to form a right angle. Thus, the rotation angle of the rotary shaft 13, that is, the rotation angle of the rotary vane 14 increases in the form of a quadratic curve with increase in the steering angle from 0°, and as in the first embodiment, the damping moment given to the handlebar 7 also increases in the form of a quadratic curve. Further, the device has a simple structure and is inexpensive.

The preferred embodiments of the present invention have been described above, but the present invention is not limited to the embodiments, and various design choices may be made within the scope of the present invention. For example, at least one of the first pivot 21 and the second pivot 22 may be constituted by a ball joint. In this case, the rotary shaft 13 does not always need to be arranged in parallel with the steering stem 5. The present invention is applicable to the motorcycle as in the embodiments, and also to any other vehicles such as a four-wheel buggy.

What is claimed is:

1. A steering damper device in which a rotary damper includes a damper case, a rotary shaft rotatably supported on the damper case, and an actuation lever connected at a portion around one of opposite ends thereof to an end of the rotary shaft, and is configured so that the rotary shaft is rotated to generate a damping force in the damper case;

the damper case is mounted to a steering member rotated around a steering stem by operation of a handlebar; and the other of the opposite ends of the actuation lever is connected, via a control lever, to a frame member that is not rotated by the operation of the handlebar, wherein one end of the control lever is rotatably connected to the frame member via a first pivot, the other end of the actuation lever is rotatably connected to the other end of the control lever via a second pivot, the first and second pivots are arranged so that a line connecting the centers of the first and second pivots is substantially intersected by an axis of the steering stem at a steering angle of 0°, and thus a rotation angle of the rotary shaft increases in the form of a quadratic curve with increase in the steering angle from 0°.

2. The steering damper device according to claim 1, wherein the actuation lever is linearly aligned with the control lever on plan view at the steering angle of 0°.

3. The steering damper device according to claim 2, wherein a spring is connected to at least one of the actuation lever and the control lever so as to rotatably urge the lever to one side, so that the actuation lever and the control lever are bent in a fixed direction around the second pivot regardless of a steering direction at the time of steering from the steering angle of 0°.

4. The steering damper device according to claim 1, wherein the actuation lever and the control lever are arranged so as to be bent around the second pivot at the steering angle of 0°, so that the rotary shaft is rotated in a fixed direction regardless of a steering direction at the time of steering from the steering angle of 0°.

5. The steering damper device according to claim 4, wherein the control lever and the actuation lever are arranged to form a right angle on plan view at the steering angle of 0°.

* * * * *